US005994697A

United States Patent [19]

Kato

[11] Patent Number: 5,994,697

[45] Date of Patent: Nov. 30, 1999

[54] ION TRAP MASS SPECTROMETER AND ION TRAP MASS SPECTROMETRY

[75] Inventor: Yoshiaki Kato, Mito, Japan

[73] Assignee: Hitachi, Ltd., Tokyo, Japan

[21] Appl. No.: 09/061,699

[22] Filed: Apr. 16, 1998

[30] Foreign Application Priority Data

Apr. 17, 1997 [JP] Japan .................................... 9-100024

[51] Int. Cl.[6] ............................ B01D 59/44; H01J 49/00

[52] U.S. Cl. ............................................ 250/292; 250/282

[58] Field of Search .................................... 250/292, 282, 250/290

[56] References Cited

U.S. PATENT DOCUMENTS

| | | | |
|---|---|---|---|
| 2,939,952 | 6/1960 | Paul et al. . | |
| 4,540,884 | 9/1985 | Stafford et al. . | |
| 5,796,100 | 8/1998 | Palermo | 250/292 |

OTHER PUBLICATIONS

"Recent Improvements in and Analytical Applications of Advanced Ion Trap Techology" by G.C. Stafford, Jr., et al., International Journal of Mass Spectrometry and Ion Processes, 60 (1984), pp. 85–98; Elsevier Science Publishers B.V., Amsterdam—Printed in The Netherlands.

*Primary Examiner*—Edward P. Westin
*Assistant Examiner*—Nikita Wells
*Attorney, Agent, or Firm*—Kenyon & Kenyon

[57] ABSTRACT

In the operation of a ion trap mass spectrometer, a high temperature gas at about 300° C. is introduced as a buffer gas. As a result, water molecules absorbed on the inner wall of the quadrupole electrodes of the ion trap mass spectrometer are desorbed and evacuated. Further, the quadrupole electrodes themselves and vacuum chamber are also heated. As the high temperature gas is introduced into the ion trap space, the time necessary for evacuating the ion trap space is shortened and the noise during the measurement time is effectively reduced. During the measurement time, the temperature is controlled to be low, and the thermal degradation of the sample is prevented.

6 Claims, 3 Drawing Sheets

ION TRAP MASS SPECTROMETER AND ION TRAP MASS SPECTROMETRY

BACKGROUND OF THE INVENTION

The present invention relates to an ion trap mass spectrometer and ion trap mass analysis method.

A mass analysis apparatus is an apparatus for separating an ionized sample by controlling an electric field or a magnetic field. Nowadays, a mass filter type mass analysis apparatus and a magnetic field type mass analysis apparatus are generally used. These types of mass analysis apparatus ionize the sample continually, and scan the ionized sample passing through the electric field or the magnetic field so as to be mass-separated. On the other hand, another type of mass analysis apparatus was suggested by Paul et al. In this apparatus, the ions are closed in a trap space by a quadrupole radio frequency electric field, and after first accumulating the ions at first, they are mass-separated. For example, such a technology is known by U.S. Pat. Nos. 2,939,952 or 4,540,884, and International Journal of Mass Spectrometry and Ion Processes, 60(1984), Pages 85–98, "RECENT IMPROVEMENTS IN AN ANALYTICAL APPLICATIONS OF ION TRAP TECHNOLOGY".

According to the above technology shown in the aforementioned U.S. Patents, after accumulating once the ions ions, when the ions are mass-analyzed, it becomes possible to mass-analyze them with a high sensitivity. However, as the ions are accumulated, problems are also inherent. That is, as the ions are accumulated over a predetermined time, the time that the ions are confined to the trap domain becomes longer. In the meantime, the ions forming the sample will have reacted with the active molecules etc. in the trap space. Thereby, the sample ions change to other ions, or become extinct, and a reduction in the mass analysis accuracy occurs.

SUMMARY OF THE INVENTION

An object of the present invention is to reduce the affection effect of the active gas in the trap space, thereby improving the accuracy of the mass analysis apparatus.

In order to achieve the above object, in the present invention, a trap space surrounded by electrodes is formed, ions are captured in the trap space by applying an alternating voltage to the electrodes, active molecules in the trap space are removed, and the ions which are captured are mass-separated after removing the active molecules.

In this way, where the active molecules remaining in the trap space are removed before mass-separating the sample ions, the effect of the active molecules in the trap space is reduced. Thereby the mass analysis accuracy is improved.

As the mass spectrum is obtained by the ion trap mass spectrometer after having once accumulated the introduced ions into the electrode used for the ion trapping, a highly sensitive measurement becomes possible, and such highly sensitive measurement is performed by introducing an appropriate quantity of the buffer gas. If the gas pressure in the ion trap is to high or to low adversely, a good result is not obtained. As explained above, if the active molecules such as water or oxygen are mixed in the gas in the trap, the ions which are introduced enter into a mutual action with the active molecules, leading to adverse results such as loss of charge, transfer, ion molecular reaction etc., and become extinct or are changed to other ions which are different from the introduced ions.

This phenomena is conspicuously found in the first action of LC/MS apparatus. In order to keep the pressure in the ion trap constant, airtightness of the space between the three electrodes is raised by using a spacing piece such as ceramic or glass. In starting the evacuation, this airtightness obstructs exhaustion in the quadrupole. Even if the vacuum of circumference of the ion trap mass spectrometer is high enough for analysis, the vacuum level and partial pressure of the water in the ion trap electrodes are not at the level at which the analysis is fully performed. Therefore, in an early step when the evacuation starts, a big problem because a stable measurement is not possible. When the mass spectrometer stops, the inside of the electrodes is exposed to atmospheric air, and as the polarity of the water and oxygen molecules are very high, they exist in a gaseous state and are absorbed on the inner wall surface of the quadrupole electrodes. These water molecules absorbed on the inner wall surface are removed progressively during the measurement, and enter into an ion molecular reaction with captured ions. This is a reason that the measurement becomes unstable for a long time. In order to prevent this problem, when the mass spectrometer is exposed to the atmosphere, the gas introduction from the buffer gas introduction system is continued after stopping the apparatus, and the enough inactive molecules are filled in the trap generally. After starting up the apparatus further, the exhaustion continues for more than overnight. However, thereby, the measurement starts after one day or more, and analysis efficiency falls remarkably.

Desirably in the present invention, in order to solve such problems stated above, the buffer gas is heated and is introduced in the quadrupole electrodes, thereby the water molecules absorbed to the inner wall of the electrode are removed. Moreover preferably, the quadrupole electrodes themselves are heated, and the removing time of the water molecules is shortened.

More preferably, before the measurement of the LC/MS, gas at high temperature is introduced so as to remove the water molecules, and after once starting the measurement, the temperature of the gas is controlled to be low and thermal degradation of the sample molecules is thereby prevented.

More preferably, the temperature setting of the trap electrode is raised while the measurement is not being performed and is controlled to be low just before the measurement starts. Thereby an even more stable measurement becomes possible.

DETAILED DESCRIPTION

Figure 1:
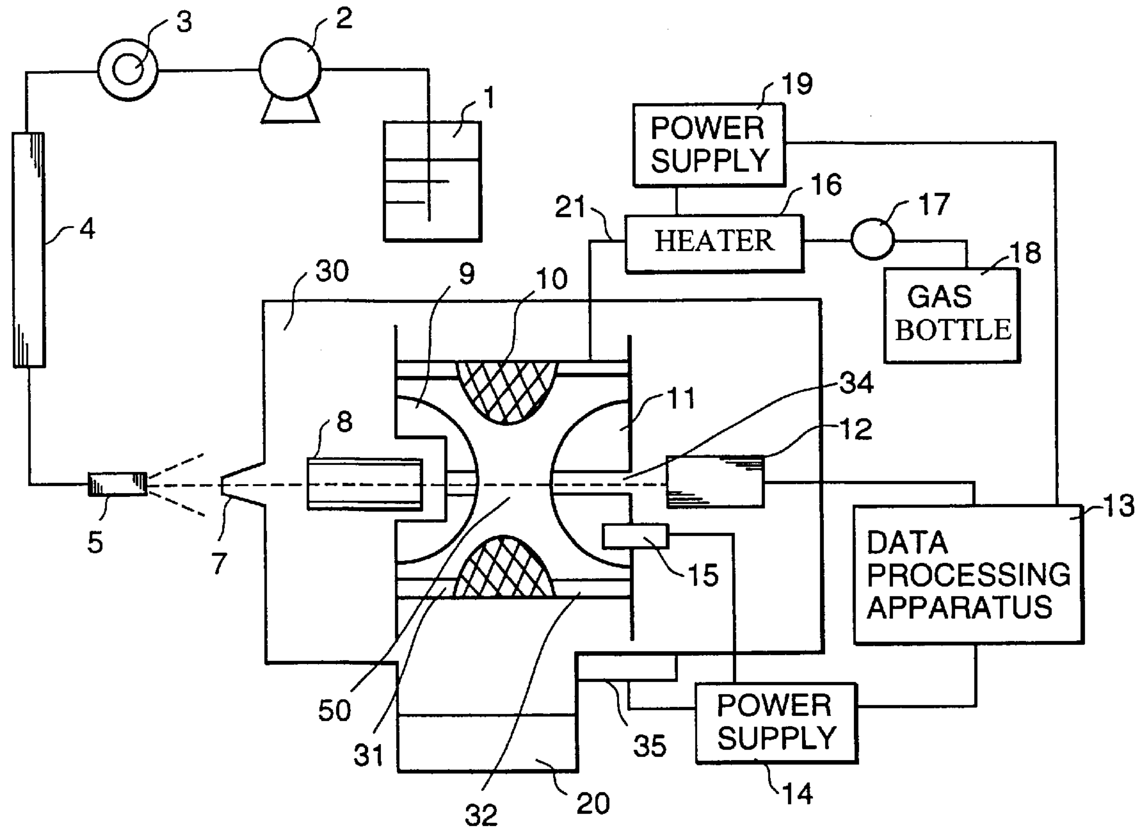
FIG. 1 is a schematic view showing an ion trap mass spectrometer according to the present invention.

One embodiment of the present invention will be explained. A schematic illustration of an ion trap mass spectrometer directly connected to a liquid chromatograph (herein after called LC) is shown by FIG. 1. The ion trap mass spectrometer directly connected to the liquid chromatograph is an apparatus to measure a very small amount of organic material dissolved in a sample liquid with high sensitivity. The mass spectrometer, which is the main part of this apparatus, may be a mass spectrometer which uses a sector shaped magnetic field or a quadrupole mass spectrometer both of which have been adopted widely. Recently, as a V small and low price mass spectrometer; an ion trap mass spectrometer has gained attention, and has come to be used in the ion trap mass spectrometer directly connected to the liquid chromatograph (herein after called LC/MS). The mobile phase solvent which is kept in a solution bottle 1 is transferred to an analyses column 4 by a pump 2, passing through an injection port 3. A sample is introduced from the injection port 3 by a micro syringe etc. While the introduced sample moves to the analyses column 4, it is separated into its components. The separated components are sent into an interface section of the LC/MS with the mobile phase solvent. As the LC/MS interface, there are various kinds of possible systems; an electrospray method (herein after called ESI) applied to the present invention will be explained here. The sample component solution leaving the analyses column 4 is sent to a probe 5 of the ESI to which a high voltage is applied. Water drops which respectively have charge are atomized from the end of the probe 5 into the air. The water drops repeatly to collide with the air molecules. Thereby the diameter of the water drops become small, and the ions are discharged into the air. The generated ions are introduced into a vacuum chamber 30 (mass analysis section). The mass spectrometer is exhausted by a vacuum pump 20 from a aperture 7 provided on a top of a skimmer of the mass analysis section 30. The ions introduced into the mass analysis section through an ion guide 8, and are sent into the quadrupole space 50. The quadrupole electrode is constructed with two end cap electrodes 9, 11, one ring electrode 10 shaped like a doughnut, and spacing pieces 31, 32 made of glass or ceramic. The inside surface of the section of the three electrodes 9, 10, and 11 is shapes like a hyperbola. The ions sent into this quadrupole space 50 are stably caught in the quadrupole space 50 by a radio frequency of about 1 MHz applied to the ring electrode 10. The ion trap mass spectrometer totalizes the ions in the quadrupole space 50 while the ions are introduced. This causes the ion trap mass spectrometer provide an excellent sensitivity, better than other mass spectrometers operated by other principles. The ions which were accumulated in electrode are discharged out from the trap space through a hole 34 opened in the center of the end cap electrode 11 by changing the voltage (amplitude) of the radio frequency applied on the ring electrode 10. The discharged ions are detected by a detector 12, and the mass spectrum is obtained by a data processing apparatus 13.

Here, in the above explanation, the mass of the ions is obtained by detecting the ions discharged from the trap space. However, the mass of the ions may be detected while the ions are captured in the trap space instead, as disclosed in U.S. Pat. No. 2,939,952(Paul).

The ions in the quadrupole space 50 oscillate so as to be captured stably by the radio frequency applied on the ring electrode 10. However, because of repulsion between ions having the same polarity, their ion orbits become bigger progressively, and the ions collide with an inner wall of the end cap electrode 9, 11 and the ring electrode 10, thereby their electric charges are lost. In order to stably capture the ions in the inside space of the electrodes for a long time, an inactive gas such as helium or Ar is introduced into inside of the quadrupole electrodes. The ions then collide with the inactive gas molecules. This collision with the inactive gas molecules remove the energy of the ions. As a result, the ion trajectory moves to the core of quadrupole electric field, that is, becomes smaller. Thereby, trapping of the ions for a long time becomes possible. Therefore, the ion trap mass spectrometer includes a gas introduction system to introduce a gas (called a buffer gas) into the inside of the quadrupole electrodes.

On the other hand, the buffer gas is introduced into the quadrupole space 50 passing through a pressure reducing valve, a needle valve 17 for flow rate adjustment from a gas bottle 18, a resistance tube 21 (a capillary tube of 0.1 mm inside diameter, 2 m long around), and an introduction entrance opened in a wall of the vacuum chamber. A heat block or a heater 16 is arranged at the circumference of the capillary tube 21. Thereby, the buffer gas is heated. Setting of this heat temperature is performed freely by the data processing apparatus 13 so as to control a heater power supply 19.

Figure 2:
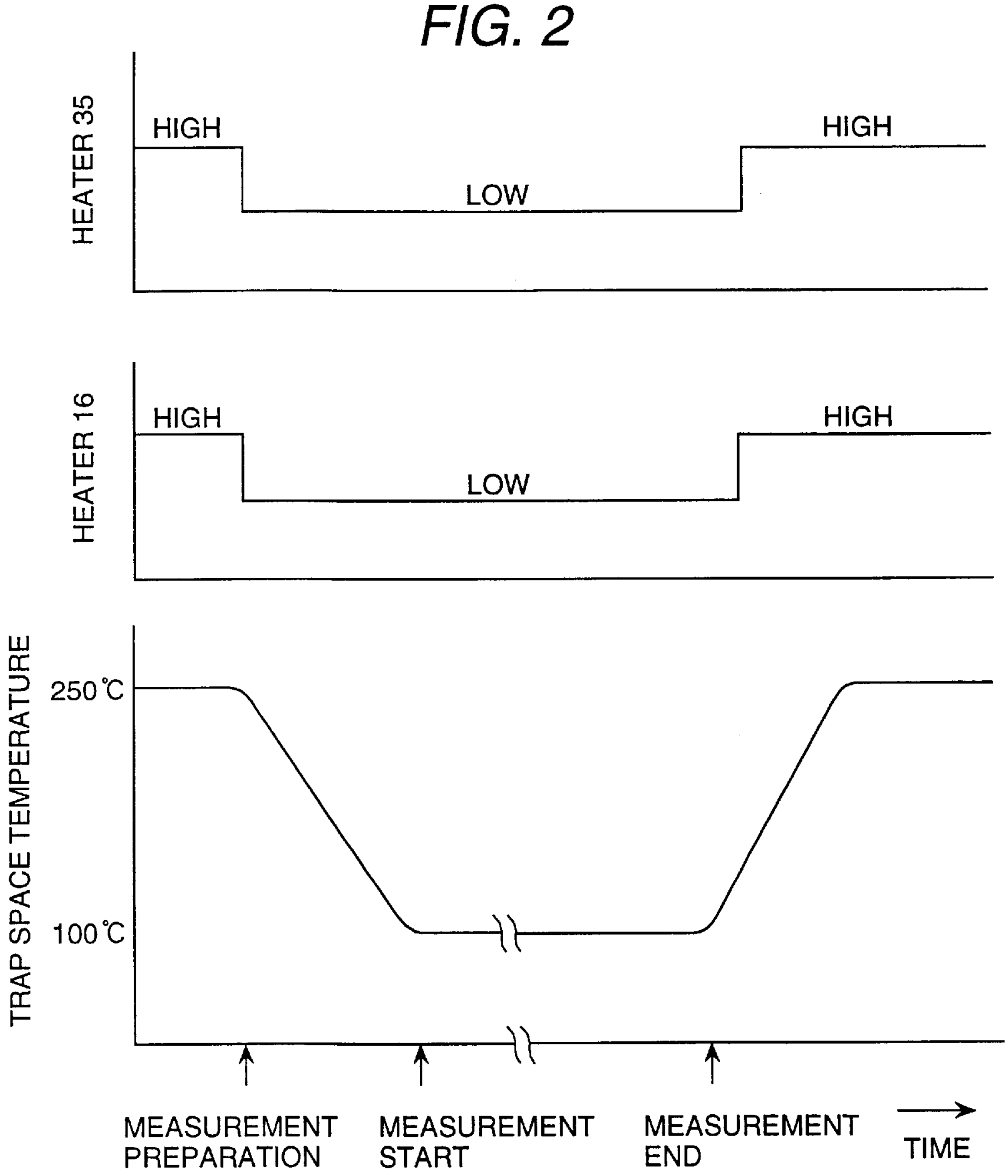
FIG. 2 is a time chart to show temperature in a trap space.

The LC/MS apparatus necessarily sends polar solvent such as water into the vacuum chamber of the mass spectrometer from the LC. Therefore, absorption of large number of polar molecules on the surface of the mass spectrometer, the vacuum chamber therein, and the electrodes arranged therein cannot be avoided. In order to prevent this absorption of the polar molecules, the vacuum chamber housing is heated with a heater 35, and the molecules absorbed are desorbed. Operation of the heater 16 and the heater 35 will be explained using FIG. 2. In a condition waiting for measurement, the heater 16 and heater 35 are heated to a high temperature together. Thereby, the temperature of the ion trap space is set up at a High value of 200 to 300° C., and the water molecules in the ion trap space are expelled. In addition to above, in the same way when the equipment is turned on by switching the power supply on, the heater 16 and the heater 35 are heated to the High value together and the temperature of the ion trap space is set to be in 200–300° C.

Furthermore, in a preparation stage of the measurement, the heater 16 and heater 35 are heated to a Low condition together, and temperature of the trap space falls gradually. The temperature is reduced to about 100° C. just before starting the measurement and the orbit and adsorption of the sample may be prevented. Even if the buffer gas is introduced in the trap space, it is preferable to continue maintaining the temperature. Therefore the quadrupole electrodes are heated synchronizing with the buffer gas.

When the measurement is finished, the heater 16 and heater 35 go to a High state again, and the temperature of the ion trap space is set higher to be 200–300° C.

Here, the present invention has been explained using the ESI as the LC/MS interface. However, the interface of LC/MS in the present invention is not limited to the ESI. For example, a many ionization methods such as an atmospheric chemical ionization (APCI), a sonic spray (SSI), and an atmospheric spray (APS) may be applied in the present invention.

As explained above, according to the above embodiments of the present invention, as the high temperature gas is introduced into the apparatus at the starting thereof, the first exhaustion time which takes 10 hours or more, can be shortened to be about 3 hours. Therefore, even if the apparatus is stopped for cleaning and replacing the component of the apparatus, there is no need to wait all day long and check of the apparatus and measurement by the apparatus became possible within that day. Moreover, the water molecules in the quadrupole electrode are desorbed and the vacuum in the quadrupole becomes clean. Thus, instability in the measurement is improved, and noise caused by the ion molecular reaction may be reduced.

Figure 3:
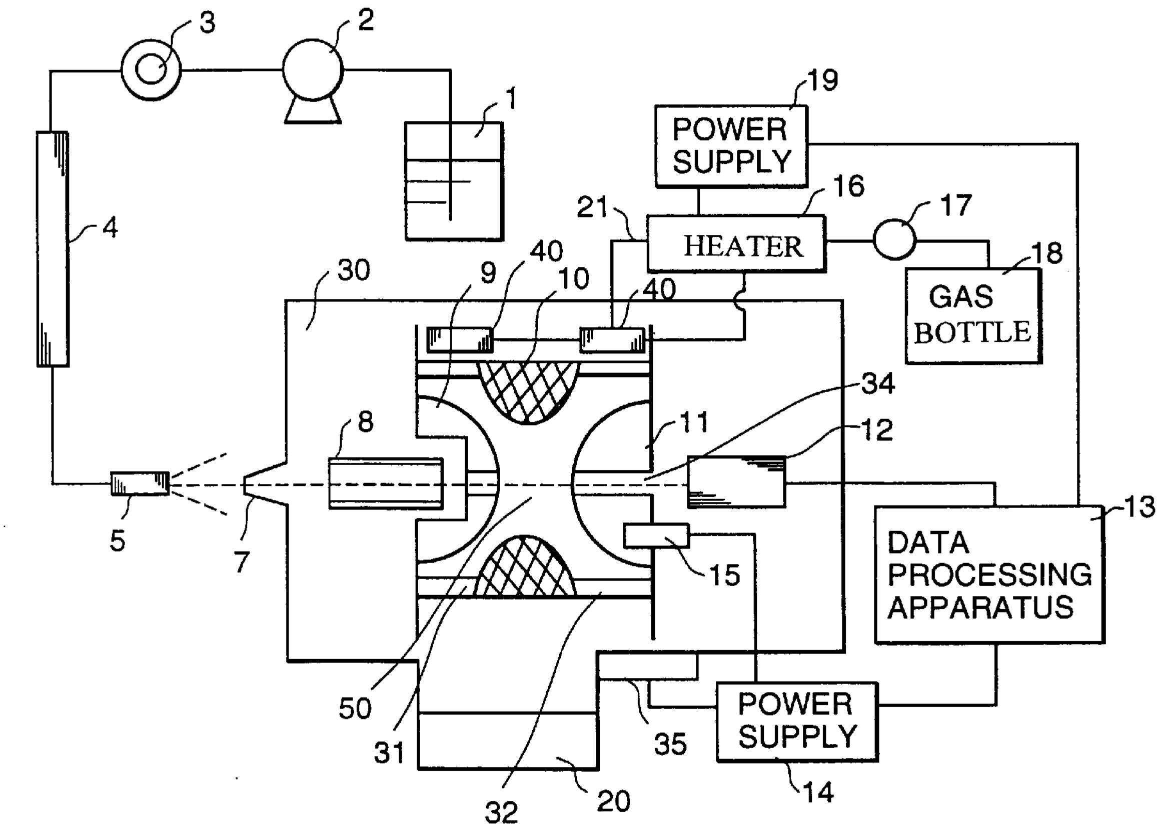
FIG. 3 shows a second embodiment of the present invention.

The second embodiment of the present invention will be explained using FIG. 3. In the second embodiment, heating of the buffer gas and the quadrupole electrode are performed with one common heater 40. Thereby, the control of the apparatus becomes easy and the manufacturing cost may be reduced.

As explained above, according to the present invention, before mass-separating the sample ions, the active molecules which remain in the trap space are expelled, the effect of the active molecules in a trap space is reduced, and the mass analysis accuracy is improved.

What is claimed is:

1. An ion trap mass spectrometer comprising an ion source for generating ions by ionizing a sample, quadrupole electrodes for generating a quadrupole field so as to capture said ions therein and mass-analyze said ions, and a buffer gas introducing means for introducing buffer gas into said quadrupole field; and a buffer gas heater for heating buffer gas introduced into said quadrupole field when said ion trap mass spectrometer is not measuring the mass of said ions so that temperature of said buffer gas becomes higher than that while said ion trap mass spectrometer is measuring said mass of said ions.

2. An ion trap mass spectrometer as defined in claim 1, said ion trap mass spectrometer and by further comprising a quadrupole electrode heater for heating said quadrupole electrodes when said ion trap mass spectrometer is not measuring the mass of said ions so that temperature of said quadrupole electrodes becomes higher than that while said ion trap mass spectrometer is measuring said mass of said ions.

3. An ion trap mass spectrometer comprising an ion source for generating ions by ionizing a sample, quadrupole electrodes for generating a quadrupole field so as to capture said ions therein and mass-analyze said ions, and a buffer gas introducing means for introducing buffer gas into said quadrupole field; and a quadrupole electrodes heater for heating said quadrupole electrodes when said ion trap mass spectrometer is not measuring the mass of said ions so that temperature of said quadrupole electrodes becomes higher than that while said ion trap mass spectrometer is measuring said mass of said ions.

4. An ion trap mass spectrometer comprising an ion source for generating ions by ionizing a sample, quadrupole electrodes for generating a quadrupole field so as to capture said ions therein and mass-analyze said ions, and a buffer gas introducing means for introducing buffer gas into said quadrupole field; and a heater for heating a vacuum chamber which maintains said quadrupole field in a vacuum state when said ion trap mass spectrometer is not measuring the mass of said ions so that temperature of said vacuum chamber becomes higher than that while said ion trap mass spectrometer is measuring said mass of said ions.

5. An ion trap mass spectrometer as defined in claim 1, said ion trap mass spectrometer further comprising a heater for heating a vacuum chamber which keeps said quadrupole field in a vacuum state when said ion trap mass spectrometer is not measuring the mass of said ions so that temperature of said vacuum chamber becomes higher than that while said ion trap mass spectrometer is measuring said mass of said ions.

6. An ion trap mass spectrometer as defined in claim 2, said ion trap mass spectrometer further comprising a heater for heating a vacuum chamber which keeps said quadrupole field in a vacuum state when said ion trap mass spectrometer is not measuring the mass of said ions so that temperature of said vacuum chamber becomes higher than that while said ion trap mass spectrometer is measuring said mass of said ions.

* * * * *